Oct. 12, 1971      A. W. PATZLAFF      3,611,689
BEATER ASSEMBLY FOR RASPBERRY HARVESTER
Filed May 25, 1970      3 Sheets-Sheet 1
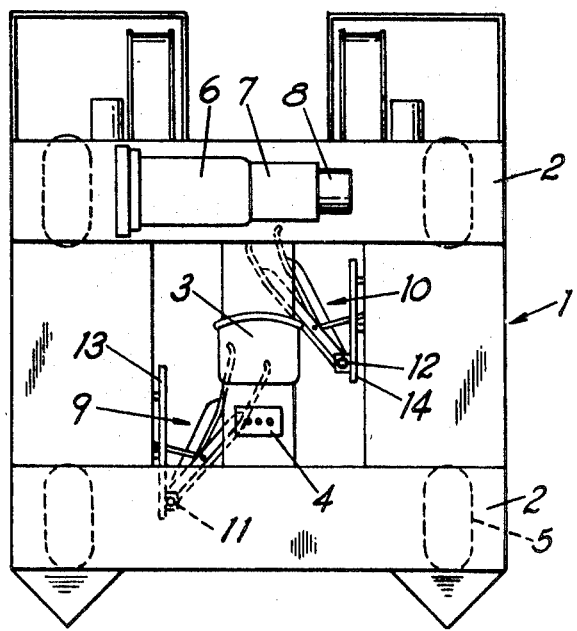
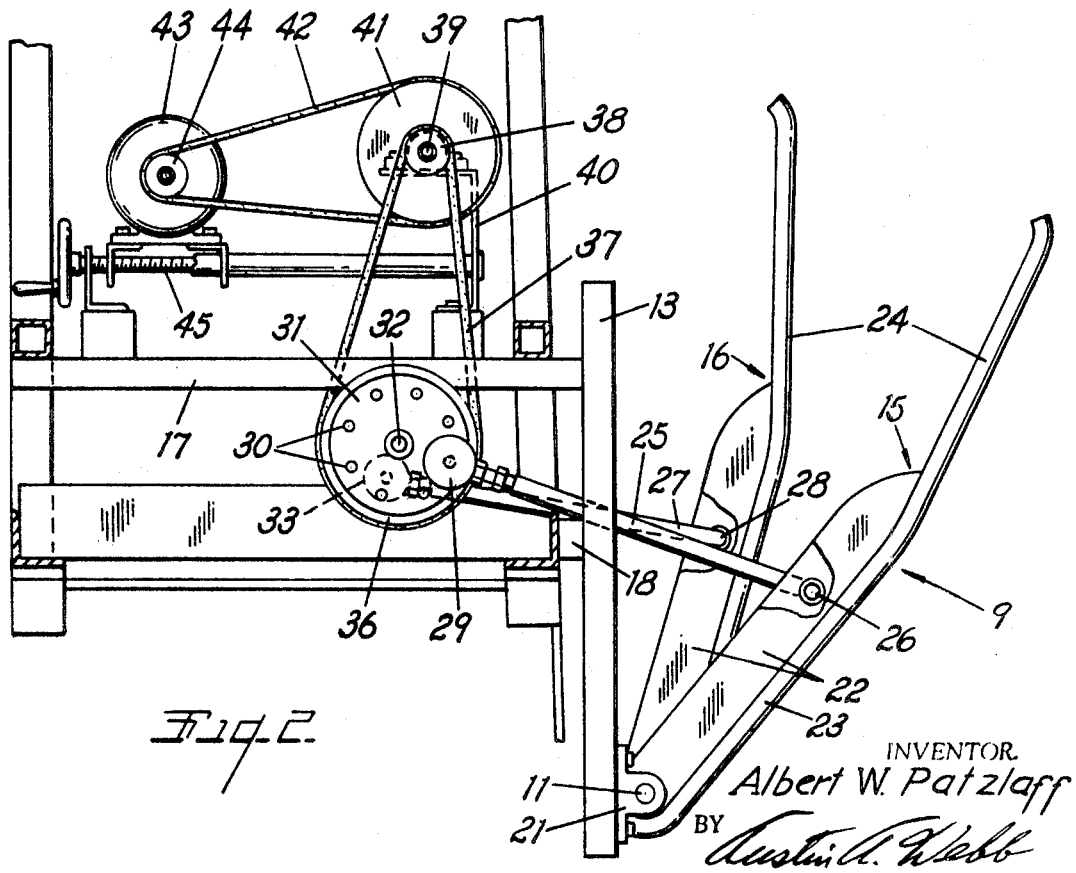
INVENTOR.
Albert W. Patzlaff
BY Austin A. Webb
ATTORNEY

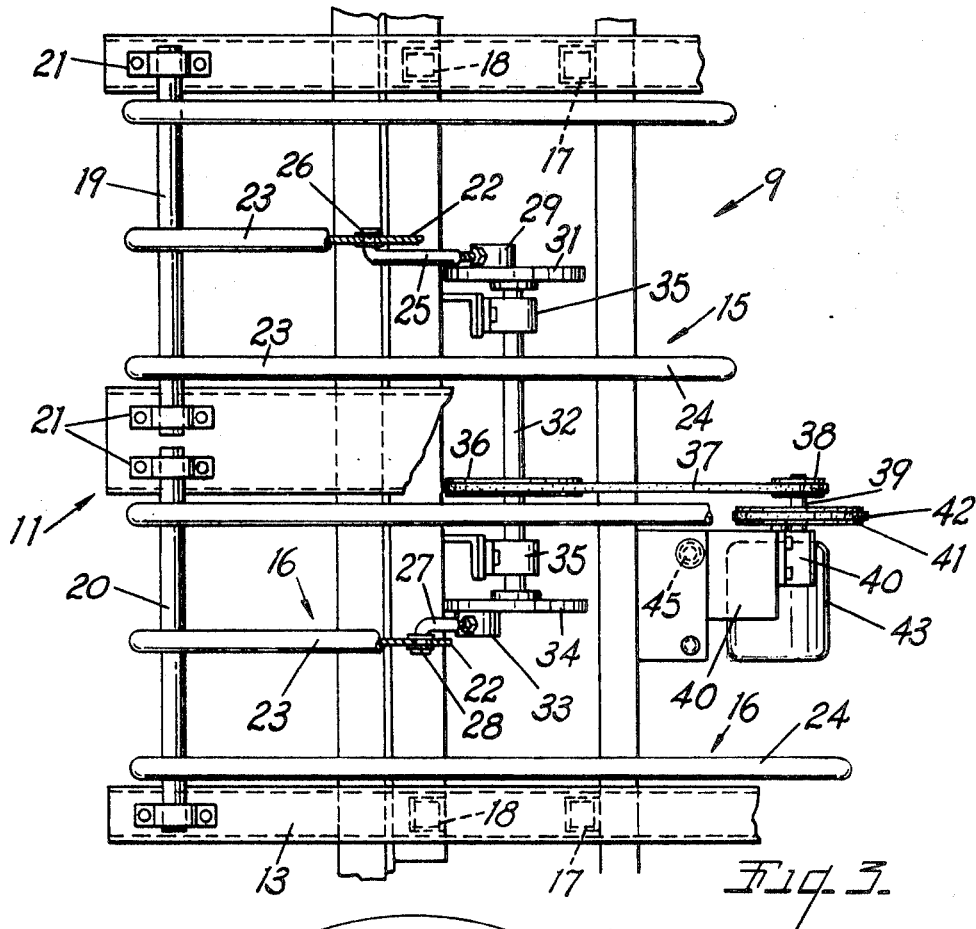
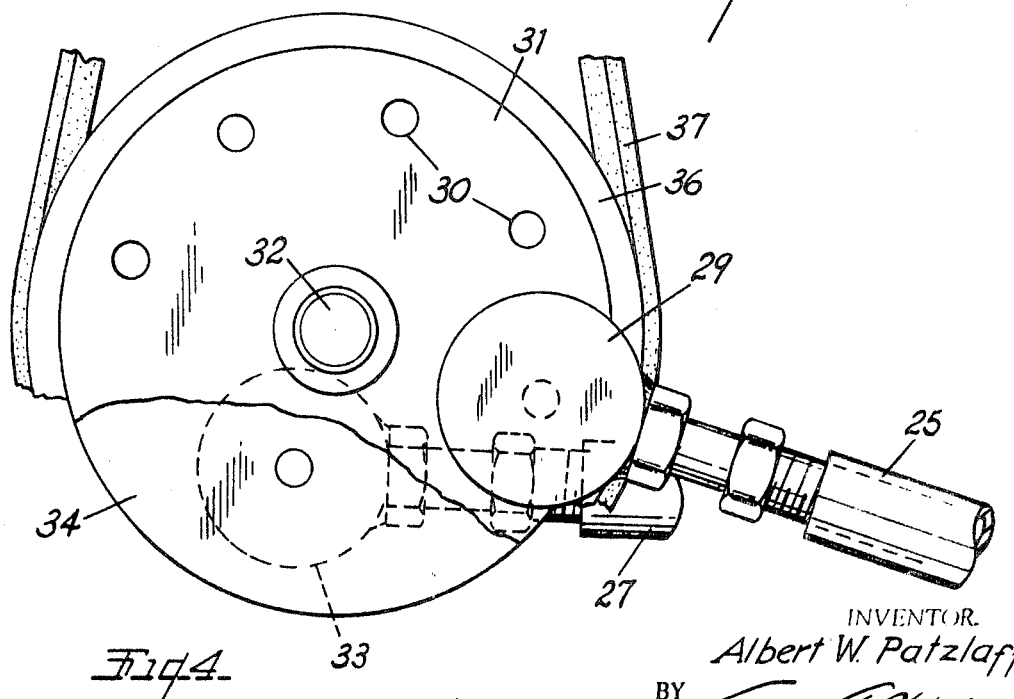

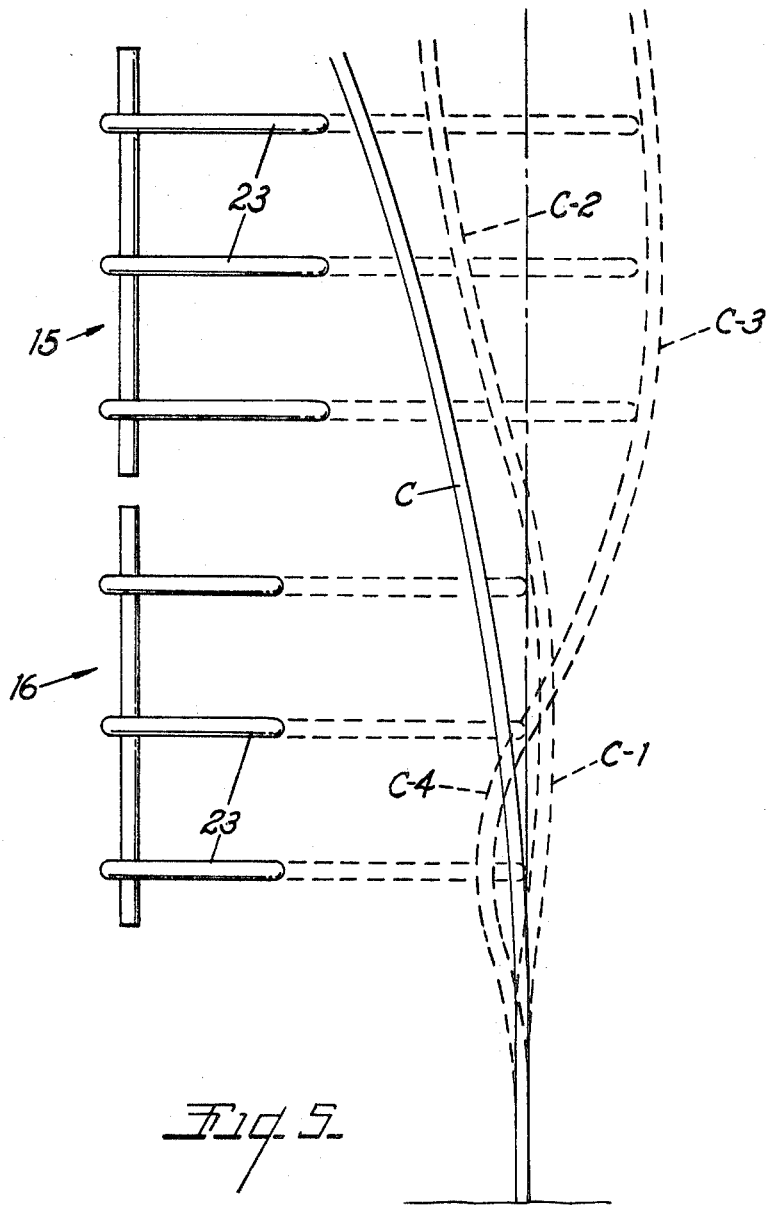

3,611,689
BEATER ASSEMBLY FOR RASPBERRY
HARVESTER
Albert W. Patzlaff, Holland, Mich., assignor to Blueberry
 Equipment, Inc., South Haven, Mich.
Filed May 25, 1970, Ser. No. 41,124
Int. Cl. A01g *19/00*
U.S. Cl. 56—330                                                    11 Claims

ABSTRACT OF THE DISCLOSURE

A mobile row crop straddling harvester has beaters pivoted to swing inwardly against opposite sides of the crop. The beaters on one side are staggered longitudinally behind the beaters on the other side. All of the beaters are formed of longitudinally extending and vertically spaced beater rods. The beaters on each side consist of vertically spaced upper and lower beater sections. Both sections are oscillated by a common drive, and the lower section has a single amplitude drive pin. The upper section is driven at a greater amplitude, and its drive pin is angularly adjustable to drive the upper beater in selectively different leading or trailing relation with respect to its associated lower beater section. The beaters on opposite sides engage the crop successively; and the action produces undulating, vertically irregular, bending or whipping movement of the crop canes engaged by the beater bars.

---

The drawings, of which there are three sheets, illustrate a preferred embodiment of the beaters and beater drives of the invention.

FIG. 1 is a top plan view of a harvester with the beaters of the invention mounted thereon.

FIG. 2 is an enlarged, fragmentary, top plan view of the beaters on the right hand side of the machine as the machine is advanced along a row crop.

FIG. 3 is an enlarged, fragmentary, inside elevational view of the beaters shown in FIG. 2.

FIG. 4 is an enlarged fragmentary top plan view of the crank wheels which drive the beaters on one side of the machine.

FIG. 5 is a conventionalized front elevational view, showing the action of the beaters on one side of the stalks or canes of a row crop.

The general arrangement of the harvester is shown in FIG. 1 in which 1 indicates the upright side frames of a carriage connected by elevated cross members 2. An operators seat 3 is supported over the center of the machine behind a control pedestal 4. Drive wheels 5 are driven from a suitable engine 6 which drives a generator 7 and hydraulic pump 8 for actuating the several driven parts of the harvester.

The beaters which engage the sides of the crop as the harvester travels over the row are indicated at 9 and 10. It will be noted that the right beaters 9 are mounted ahead of the left beaters 10.

The beaters are mounted to swing about upright pivots 11 and 12 carried by suitable bearings on the side frames 13 and 14. The beaters are the same on each side of the machine, so a description of one side will suffice. It will be appreciated that suitable collecting plates, baffles and belts are mounted along the bottom of the harvester to catch fruit shaken off by the beaters, but since this collecting mechanism is generally old, it is not illustrated.

FIG. 2 shows the right beaters in top plan with a top beater section indicated at 15 and a lower beater section at 16. The side frame 13 is connected at its rear end to cross bars 17 of the upright frame 1, while the longitudinal mid-section of the frame is connected by the struts 18 to an upright post of the main side upright of the machine. As appears more clearly from FIG. 3, the pivot 11 is divided into an upper shaft 19 and a lower shaft 20. The shafts are supported by suitable bearings 21.

Each beater section 15 and 16 consists of three arms 22 connected to the related shaft section of the pivot 11, with a beater bar 23 secured along the forward edge of each arm and angled rearwardly at 24. An upper connecting rod 25 is pivotally connected to the center arm of the three beater bars of the upper beater section at 26. A lower connecting rod 27 is connected to the middle arm of the lower beater section at 28. The laterally outer ends of the upper connecting rod is adjustably connected to a crank pin 29, which is in turn oscillatably and selectively received in one of eight holes 30 formed in spaced relation around an upper crank wheel 31. The crank wheel is rotatably driven by a right drive shaft 32. The lower connecting rod is connected at its inner end to a lower crank pin 33 oscillatably received in a hole in a lower crank wheel 34. The lower crank wheel is driven by the same drive shaft 32 as the upper crank wheel. It is pointed out that the throw of the lower crank pin is somewhat less than the throw of the upper crank pin. The upper crank pin is shown as being mounted in angularly trailing relation to the lower crank pin, but may be adjusted or moved into other phase relationship to the lower crank pin.

The drive shaft 32 is supported in bearings 35 on the upright side of the carriage. It has a pulley 36 near its center that is driven by the belt 37 from a pulley 38 and stub shaft 39 mounted on a bracket 40. The stub shaft is driven by a larger pulley 41 and belt 42 from the motor 43. The motor 43 has a variable pulley 44 and is adjustably mounted on a screw shaft 45 so that the rotational speed of the drive shaft 32 may be adjusted as desired. In operation of the harvester to collect black raspberries, the shaft is driven at between 120 and 400 r.p.m., with about 250 r.p.m. being usual.

The action of the beater bars is conventionally shown in FIG. 5 where a representative stalk or cane C of a raspberry bush located on the center line of the harvester is indicated in its normal position at C. The bars 23 of the lower beater section 16 advance to the right in leading relation to the upper beater section 15. These deflect the mid-section of the cane in a bow to the right as at C–1 while the upper portion at C–2 lags behind due to inertia and friction with adjacent canes. The bars of the upper beater section 15 then advance a further distance into the bush, and swing the top of the cane to C–3. This occurs as the lower beater section starts to retract, so the lower portion of the cane reverts toward its original position as at C–4.

It will be seen that the two beater sections impart an undulating or whipping motion to the canes; and that the upper main fruit bearing portion is forced between other canes that may not be contacted at the same time and to the same degree as the sample cane illustrated. The whipping action is of course repeated in reverse as the left beaters 10 are advanced by the machine. The resulting action is that fruit on the canes, particularly black raspberries, is actually pulled from the cane by movement relative to and between adjacent canes.

By adjusting the position of the crank pin 29 on the upper crank wheel 31, the action of the beaters can be adjusted to obtain the whipping motion which is most effective on berries of different types and maturities.

The beaters 9 and 10, on opposite sides of the machine, are driven by separate motors, so there is no necessary synchronization of the opposite beaters.

What is claimed as new is:

1. Bush shaker mechanism for a row crop straddling harvester comprising,
    plural beaters mounted on the opposite inner sides of the harvester, the beaters on each side comprising vertically spaced upper and lower beater sections, the beater sections comprising vertically spaced and longitudinally extending beater bars pivoted at their forward ends to the sides of the harvester, and drive means carried by the sides of the harvester connected to separately swing the beater sections laterally inwardly in an oscillating motion as the harvester advances along the crop row.

2. Shaker mechanism as defined in claim 1 in which the beaters on opposite sides of the machine are offset longitudinally of the machine.

3. Shaker mechanism as defined in claim 2 in which the amplitude of the swinging motion of the upper beater sections is greater than the amplitude of the lower beater sections.

4. Shaker mechanism as defined in claim 3 in which the lower beater sections are arranged to advance before the upper sections.

5. Shaker mechanism as defined in claim 3 in which the drive means for part of the beater sections are adjustable to change the phase relation of the motions of the upper and lower beater sections.

6. Shaker mechanism as defined in claim 1 in which the drive means for part of the beater sections are adjustable to change the phase relation of the motions of the upper and lower beater sections.

7. Shaker mechanism as defined in claim 6 in which the amplitude of the swinging motion of the upper beater sections is greater than the amplitude of the lower beater sections.

8. Shaker mechanism as defined in claim 1 in which said drive means comprises an upright drive shaft mounted on each side of the harvester and having upper and lower crank wheels on its ends, connecting rods connected between said crank wheels and said beater sections, and motors connected to rotate said drive shafts.

9. Shaker mechanism as defined in claim 8 in which said motors have variable speed drive connections to said shafts.

10. Shaker mechanism as defined in claim 8 in which said shafts are driven at about 250 r.p.m.

11. Shaker mechanism as defined in claim 9 in which said variable speed drive is arranged to drive said shafts at between 120 r.p.m. and 400 r.p.m.

References Cited
UNITED STATES PATENTS

| | | | |
|---|---|---|---|
| 3,203,159 | 8/1965 | Weygandt et al. | 56—1 |
| 3,473,311 | 10/1969 | Fox | 56—330 |
| 3,485,027 | 12/1969 | Ganger | 56—330 |
| 3,494,117 | 2/1970 | Weygandt et al. | 56—330 |

RUSSELL R. KINSEY, Primary Examiner